United States Patent [19]

Burleigh

[11] Patent Number: 5,361,723
[45] Date of Patent: Nov. 8, 1994

[54] SQUIRREL RESISTANT BIRD FEEDER

[76] Inventor: Joseph H. Burleigh, 50 Lawndale Ave., Franklin, N.H. 03235

[21] Appl. No.: 112,384

[22] Filed: Aug. 27, 1993

[51] Int. Cl.⁵ .......................................... A01K 39/014
[52] U.S. Cl. .................................................. 119/52.3
[58] Field of Search ................... 119/52.1, 52.2, 52.3, 119/54, 57.8, 57.9

[56] References Cited

U.S. PATENT DOCUMENTS

| D. 245,349 | 8/1988 | Fisher . | |
|---|---|---|---|
| D. 289,211 | 4/1989 | Riha . | |
| D. 329,509 | 9/1992 | Burleigh . | |
| 985,201 | 2/1911 | Owens | 119/52.1 |
| 1,005,071 | 10/1911 | Kandall | 119/52.1 |
| 1,222,389 | 4/1917 | Goelzer | 119/52.1 X |
| 2,884,899 | 5/1959 | Jackes et al. | 119/52.1 X |
| 3,316,884 | 5/1967 | Viggars | 119/52.3 |
| 3,977,363 | 8/1976 | Fisher . | |
| 4,259,927 | 4/1981 | Clarke . | |
| 4,389,975 | 6/1983 | Fisher, Jr. | 119/52.3 |
| 4,838,205 | 6/1989 | Larson | 119/52.2 |
| 4,896,628 | 1/1990 | Kadunce | 119/52.1 X |

OTHER PUBLICATIONS

Hyde Bird Feeder Co., catalog Fall-Winter 1993-1994.

*Primary Examiner*—Gene Mancene
*Assistant Examiner*—Thomas Price
*Attorney, Agent, or Firm*—Michael J. Weins

[57] ABSTRACT

The present invention is for bird feeders which are resistent to invasion by squirrels, pigeons and other large birds. The feeder has a hopper with a sloped sidewall to which a feed tray attaches. The angle φ between the sidewall and the feed tray is greater than about 60° and less than 70°. The separation of the perches on which the birds rest from the sidewall of the hopper is between about ¾" and 1¾". The feeder has a roof which covers the hopper and preferably forms a convex cover.

25 Claims, 10 Drawing Sheets

SQUIRREL RESISTANT BIRD FEEDER

FIELD OF INVENTION

The present invention is directed to a bird feeder and, more particularly, to one which limits the accessibility of the feed to squirrels and pigeons.

BACKGROUND OF THE INVENTION

Eliminating squirrels and other uninvited guests such as pigeons from feasting at bird feeders intended for small birds has long been a problem.

U.S. Pat. No. 3,977,363, has sought to squirrel proof a hanging bird feeder by providing a dual pitched roof. As the squirrel moves down the roof, the bird feeder, which hangs from a chain, tips and dumps the squirrel. This device depends on the pivoting action of a hanging bird feeder and will not perform well for large feeders where the center of gravity will not be greatly effected by the motion of the squirrel on the roof.

The limitation of the '363 patent to hanging bird feeders has, in part, been overcome for pole mounted feeders by using baffles mounted below the feeder such as is taught in U.S. Pat. Nos. 4,389,975 and 4,259,927. The use of baffles requires additional parts and will neither provide protection from uninvited flying guests nor, for that matter, from jumping squirrels. To overcome the problem of jumping squirrels, the '975 patent proposes a feeder which is rotatably mounted on a post to provide a "merry-go-round" effect to discourage jumping squirrels.

Thus, there is a need for a simpler bird feeder which is effective in warding off uninvited guests.

OBJECTS OF THE INVENTION

It is an object of the invention to provide a bird feeder which is resistant to invasion by squirrels.

It is an object of the invention to provide a bird feeder which is resistant to invasion by uninvited birds such as pigeons, crows and starlings.

It is still another object of the invention to provide a bird feeder that will provide a comfortable feeding environment for song birds while providing protection from predatory birds such as hawks.

Yet another object of the invention is to provide a feeder with large capacity.

It is another object of the invention to provide a feeder where the feed level can be readily visually monitored.

Still another object of the invention is to provide a feeder that can be readily filled.

It is a further object of the invention to provide a feeder that will protect the feed from the elements such as snow and rain.

It is a further object of the invention to provide a bird feeder which is resistant to wind scouring of the feed from the feed tray.

It is a further object of the invention to provide a feeder which can partition the feed to permit storage of multiple feeds and provide separate feeding areas for various feeds.

It is still a further object of the invention to provide a bird feeder that may be disassembled for cleaning.

It is yet another object of the invention to provide a bird feeder from which the seed cannot be readily scattered by the birds while feeding.

These and other objects of the invention will become apparent from the following description of the invention, drawings and claims.

SUMMARY OF THE INVENTION

The present invention is an improved bird feeder which is selective in the size range of birds it will feed and makes access of undesirable guests such as squirrels and pigeons difficult. The feeder of the present invention has a feed tray with perches, a feed hopper and a roof covering the hopper.

The feeder has a hopper bounded by a hopper sidewall. The hopper sidewall has a base end and a top end. A feed tray is provided which attaches to the base end of the feed hopper. A portion of the feed tray extends beyond the base end of the feed hopper forming feeding compartments. Perches attach to, or are an integral part of the feed tray which extend beyond the base of the feed hopper. Ports are provided that communicate between the feeding compartments and the hopper.

The hopper sidewall is shaped such that, when attached to the feed tray, the included angle $\phi$ formed between the sidewall and the tray is greater than about 60° and less than 70°; preferably, the angle $\phi$ is between about 65° and 70°. It is still further preferred that the angle $\phi$ be about $67\frac{1}{2}''$. When these angular relationships are maintained, in combination with maintaining the separation between the perches and the hopper sidewall between about $\frac{3}{4}''$ and $1\frac{3}{4}''$ the bird feeder will discourage uninvited guests by making it uncomfortable for squirrels and birds, such as pigeons, to feed from the perches. This broad range of perch spacing, in turn, has a sub range of $\frac{3}{4}''$ to $1''$ which will be effective against squirrels when the angle $\phi$ approaches the upper limit of about 70°. This separation range can be expanded to about $\frac{3}{4}''$ to $1\frac{3}{4}''$ when the angle $\phi$ is maintained between about 65° and 70°. The proximity of the perches to the walls, in combination with the slope of the wall in the vicinity of the shoulder height of the squirrel also makes the perches an undesirable resting spot from which squirrels may feed, since they cannot maintain their center of gravity above the perch.

The hopper sidewall can be a continuous smooth surface or a faceted surface. When the hopper has a smooth surface such that a horizontal cross section of the hopper is circular, the resulting hopper will be a frusto-conical hopper. When the hopper has a faceted surface such that a horizontal cross section of the hopper forms a polygon, the wall can be constructed from panels. If for example the cross section is square, then the hopper will be a frustum.

While the configuration of the hopper will generally be discussed for the case when a vertical cross section will be straight lines, it should be appreciated that other vertical cross sections are possible, such as cross sections defined by exponential curves which can be used to generate a trumpeted or outward flaring hopper. In the case of the non-linear wall hopper, the angle $\phi$ will be measured by the tangent to the wall at squirrel shoulder height. This height is about $1\frac{1}{2}''$.

A roof is provided which is supported by the top end of the hopper wall. To further enhance the selectivity of the bird feeder and to make it more squirrel resistant, it has been found that providing a roof having a peripheral edge which overhangs the perches can be most effective when constructed with a smooth surface. A preferred construction material is plastic which has desirable properties, such as low density, corrosion resistance and the ability to be transparent so the birds can recognize the feed under the roof.

It is further preferred that the overhang is such that an angle with respect to the horizontal of not greater than 48° be maintained between the overhang and the perches when measured by a ray of minimum length from the perch extremity to the roof perimeter.

It is yet further preferred that when there is a substantial overhang such as is discussed above, that the vertical separation between the perches and the periphery of the roof be less than about 5". This overhang will further limit access to hovering birds such as pigeons.

It is also further preferred that the roof form a convex surface covering the hopper. One preferred roof is a spherical section where the minimum pitch in the vicinity of the periphery of the roof is about $22\frac{1}{2}°$. Another preferred roof configuration is a roof constructed from planar sections having a common apex. These planar sections also have a minimum pitch of $22\frac{1}{2}°$.

The roof, hopper, and feed tray are provided with means for attaching the same. One preferred means for attaching the roof, hopper and feed tray is a cable used in combination with a rod. The cable is attached to the rod which in turn is attached to the feed tray. When the hopper is positioned on the feed tray the rod is located in the hopper. The cable is attached to the rod and extends beyond the hopper. The cable passes through the roof and, when the feeder is hung by the cable, maintains the roof in position over the hopper. Another preferred means for attaching the roof, hopper and feed tray is a central post that attaches to the feed tray and extends through the hopper. A hanger, which rests on the roof, attaches to the post and maintains the roof in position on the hopper. The hanger can be a hook which attaches to an eye or chain from which the feeder is to be hung.

The feed tray employed with the roof and the hopper of the present invention has several preferred configurations. One such configuration is a base plate having peripheral sidewalls. A feeding trough is formed between the peripheral sidewalls and the hopper sidewall. Another configuration of the feed tray is a solid platform, preferably a wooden plank having depressions machined therein. The depressions are so positioned that the base end of the hopper sidewalls divides the depressions into feed well segments and hopper segments. The feed well segments lie outside of the hopper providing feed wells from which the birds can eat. The hopper segments lie in the hopper and serve as hopper ports which supply feed to the feed wells.

BEST MODE OF CARRYING THE INVENTION INTO PRACTICE

Figure 1:
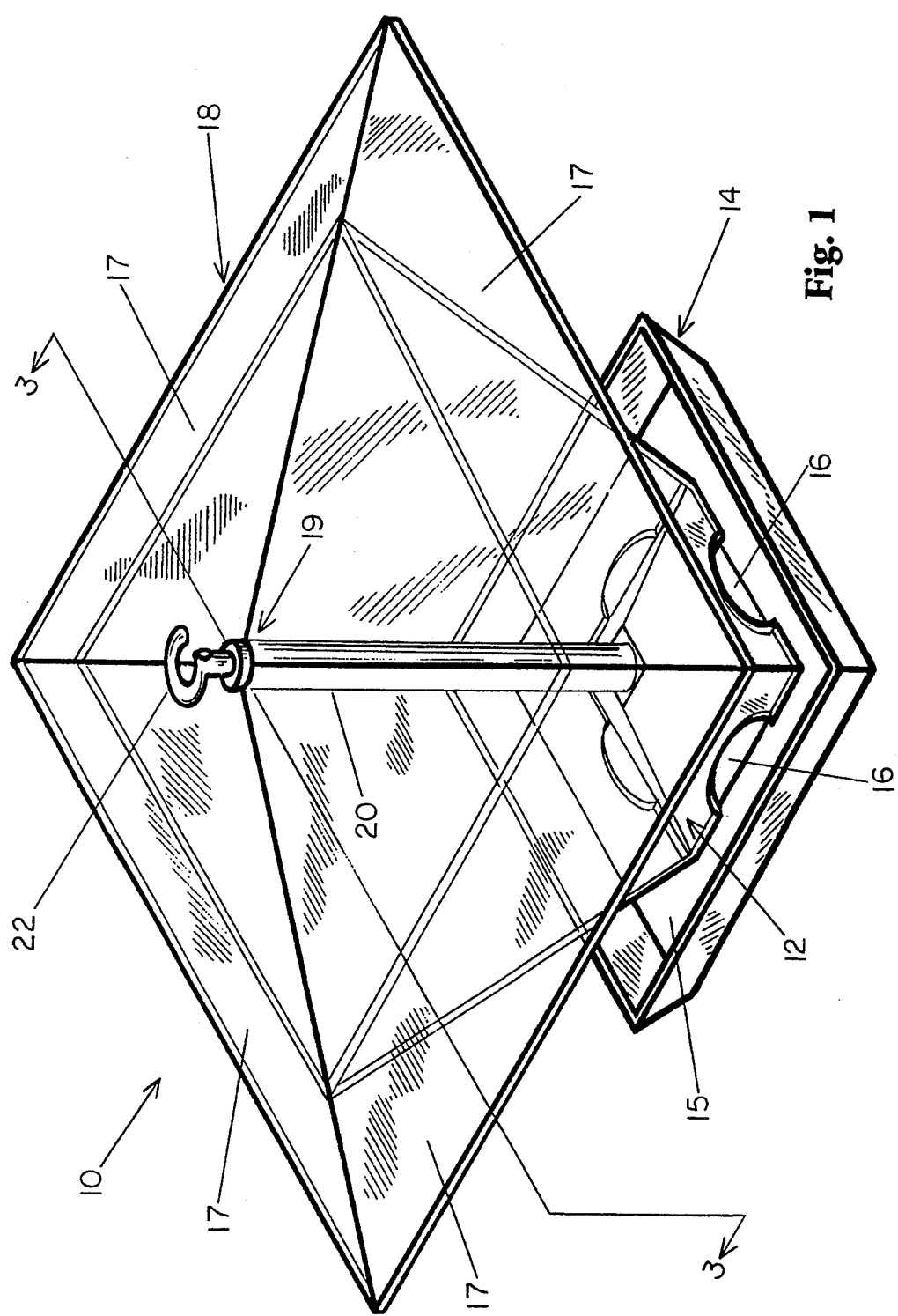
FIG. 1 is an isometric view of one embodiment of a bird feeder of the present invention. The bird feeder has a feed hopper with a square cross section and a convex roof constructed from planar sections having a common vertex. The planar sections slope downward over the hopper and extend there beyond.

FIGS. 1 through 4 illustrate one embodiment of the present invention. FIG. 1 illustrates a bird feeder 10 having a hopper 12 which rests on a feed tray 14. The region between the feed tray 14 and the hopper 12 provides feed compartments which form adjoining feed troughs 15. It is preferred that the hopper 12 be transparent allowing visual observation of the feed level. Ports 16 are provided in the hopper 12 allowing communication between the hopper 12 and the trough 15. A roof 18 provides a convex cover for the hopper 12.

The roof 18 has planar sections 17 that meet at a common vertex 19. It is further preferred that the roof 18 be smooth to minimize traction for squirrels on the roof. A preferred material for a smooth roof is a plastic which is light weight and resistent to damage from the elements. A transparent plastic roof is further preferred since the birds will be visually attracted to a feeder below them since the feed can be seen by them from the air.

The feed tray 14, the hopper 12 and the roof 18 are secured by a center post 20 attached to the tray 14. The center post 20 passes through the hopper 12 and aids in the positioning of the feed tray 14 with respect to the hopper 12 and attaches to a hanger 22 which is supported by the roof. The pressure exerted by the hanger 22 holds the roof 18 in contact with the hopper 12. The hanger 22, illustrated in FIG. 1, is a hook which can be attached to a chain or an eye to which the feeder 10 is mounted.

Figure 2:
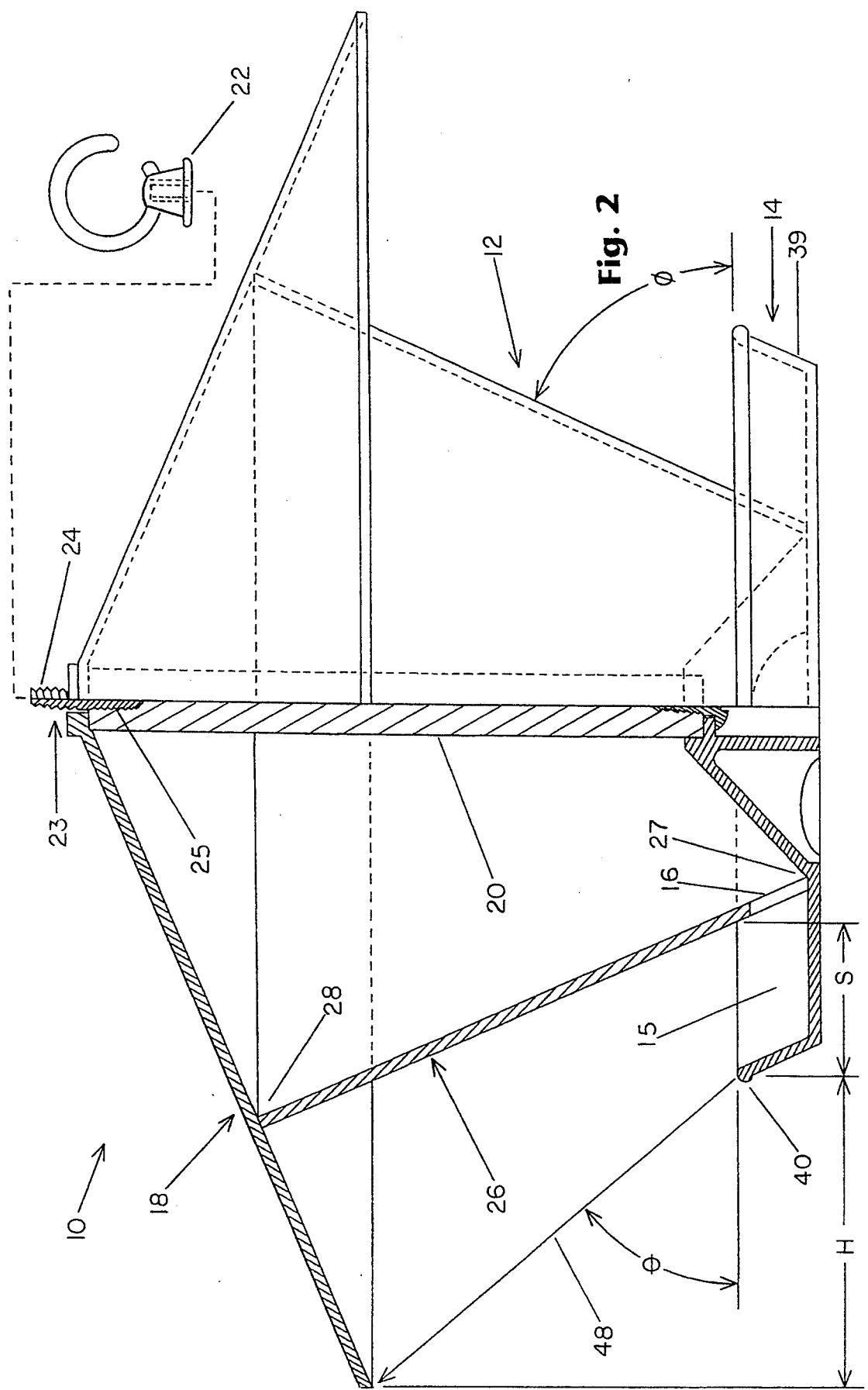
FIG. 2 is a side elevation view in partial cross section of the bird feeder of FIG. 1. Since the feeder has a hopper with a square cross section, the side view and the end view are identical.

FIG. 2 illustrates a side elevation view, a portion of which is shown in cross section, of the bird feeder 10 shown in FIG. 1. Since the bird feeder 10 of FIG. 1 has a square cross section, the side view will be identical to an end view, with the exception of the hanger 22 which holds the roof 18 in place. The hanger 22, which for the embodiments of FIGS. 1-4 is a hook, is attached to the center post 20 by means of a shaft 23, having a first threaded section 24 for engaging the hanger 22 and a second threaded section 25 which is embedded into the center post 20. The hopper 12 has a sidewall 26 with a base end 27 and a top end 28. The base end 27 engages the tray 14 while the top end 28 supports the roof 18.

Figure 3:
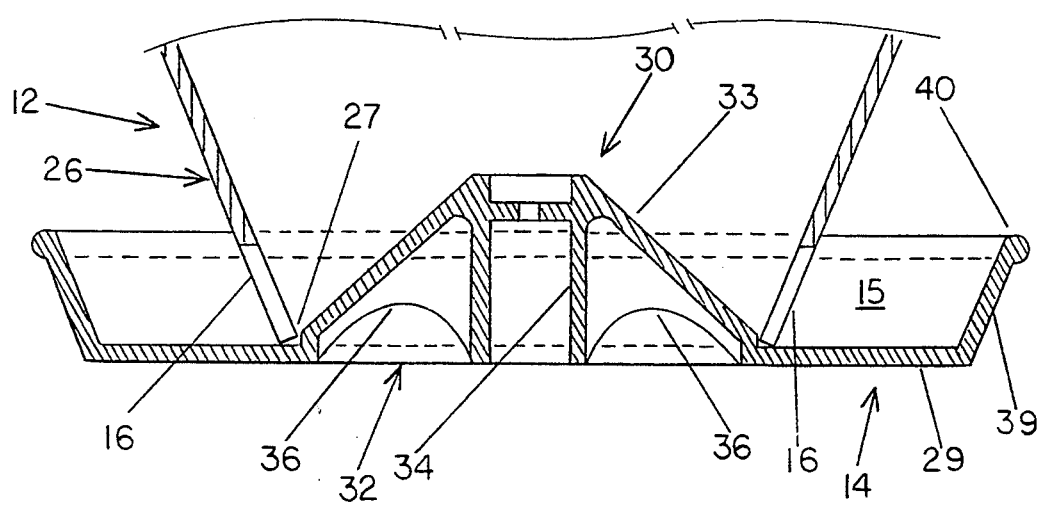
FIG. 3 is a partial view of the cross section 3—3 of FIG. 1 illustrating the spacial relationship between the tray of the feeder and the hopper. The tray has a raised center section which serves a three-fold purpose. The raised center assures that the feed will be made available to the feeding compartments which are troughs; provides a cavity for pole mounting the feeder and prevents birds from entering the hopper through the feed ports and becoming trapped inside the hopper.
Figure 4:
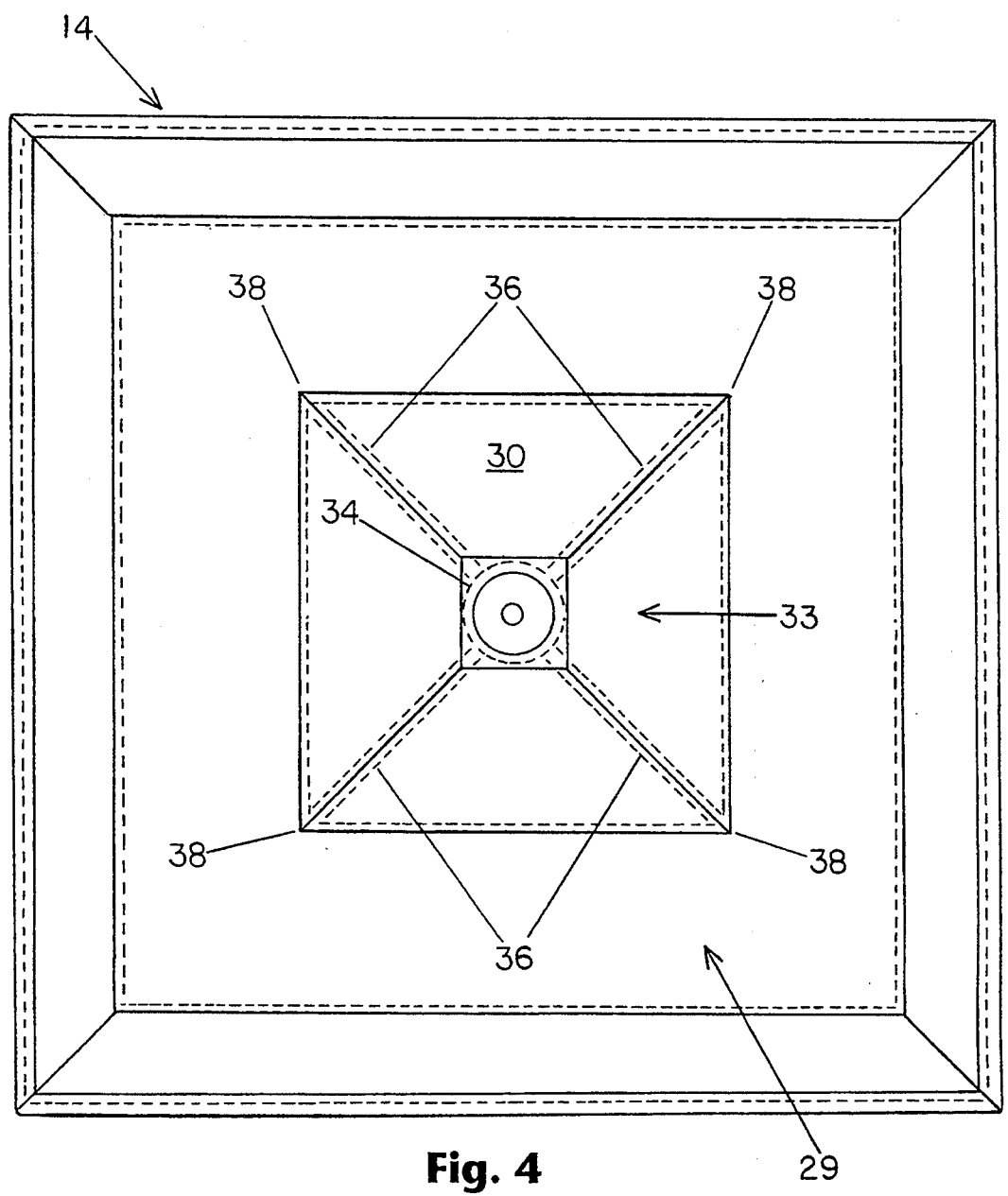
FIG. 4 is a top view of the feed tray used in the embodiments illustrated in FIGS. 1-3.

FIG. 3 shows a partial cross section 3—3 of FIG. 1 showing the feed tray 14 and the lower portion of the hopper 12 including the base end 27. The feed tray 14 of FIG. 3 has a planer base surface 29 with a raised section 30 creating a cavity 32 on the planer base surface 29 in the central portion of the feed tray 14. The raised section 30 is contoured to form a hopper bottom wall 33 which is raised. The hopper bottom wall 33, in this embodiment, is rectangular in cross section and sized so as to engage the base end 27 of the sidewall 26. The spacial relationship between the base end 27 and the raised section 30 assures that the hopper 12 will be sealed with respect to the feed base tray 14. Having the hopper 12 resting on the planer base surface 29 while providing the raised section 30 will also limit the passage of the feed to the trough 15 via the ports 16 as well as prevent birds from entering the hopper 12 when empty through the port 16 and becoming trapped in the empty feeder 10. A pole sleeve 34 is provided in the cavity 32. Ribs 36 are positioned in the cavity 32 to provide support to the pole sleeve 34. FIG. 4 illustrates the spacial distribution of the ribs 36 in cavity 32 under the raised section 30 of the planar base surface 29 of the feed tray 14. The ribs 36 are attached to the pole sleeve 34 and project radially to corners 38 of the raised section 30. The ribs 36 are also attached to the hopper bottom wall 33 providing additional rigidity to the pole sleeve 34 for mounting the feeder on a pole.

As illustrated in FIGS. 2 and 3, the feed tray 14 has a peripheral feed tray sidewall 39 which is substantially vertical and terminates at a peripheral edge 40. The peripheral feed tray sidewall 39 and the hopper sidewall 26 define the sides of the feed trough 15 therebetween, while the peripheral edge 40 serves as a perch for the feed through 15. The spacial relationship between the peripheral edge 40 which serves as a perch for the feed tray 14, and the hopper 12, makes it difficult for squirrels and pigeons to eat in comfort. It has been found that when the angle $\phi$, as illustrated in FIG. 2, between the hopper sidewall 26 and the feed tray 14 is greater than about 60° and less than 70°, squirrels are generally discouraged from feeding. At a preferred angular range $\phi$ of between 65° and 70°, and more preferably at an angle $\phi$ of about $67\frac{1}{2}$,° squirrels are found not to invade the feeder. As discussed earlier, for the range of the angle $\phi$ to be effective, the spacing of the perch from the hopper sidewall 26 must be controlled. To be an effective feeder that will allow access to the birds while limiting access to squirrels, the perch should be maintained at a distance S from the sidewalls 26 where S is between about $\frac{3}{4}''$ and about $1\frac{3}{4}''$. In the embodiment illustrated in FIGS. 1-4, this is also the distance between the peripheral edge 40 of the feed trough 15 since the peripheral edge 40 also serves as the perch. This limitation on the spacings between the perches and the hopper sidewalls 26 will also assure the feed will be able to flow from the hopper 12 through the ports 16 and substantially fill the troughs 15.

The broad range of perch spacing is most effective when the distance S is further restricted for particular ranges of $\phi$. These limitations can be better appreciated in view of the information contained in Table 1. This information was developed by observing the effect of the sidewall angle $\phi$ in combination with perch to sidewall specification.

As can be seen from the data of Table 1, as the angle $\phi$ approaches 70° there is a sharp drop in the effectiveness of the feeder in preventing squirrels and pigeons from being able to access the bird feeders. At about 70° only a $\frac{3}{4}''$ to 1'' distance S between the perch and the sidewall will prevent squirrels and/or pigeons from feeding at the feeder. At about $67\frac{1}{2}$° the separation S where the bird feeder will be effective in preventing squirrels and pigeons from feeding can be readily increased to $1\frac{3}{4}''$. Thus, the increased spacing will also allow larger birds to feed at the feeder.

The lower limit will allow small birds such as chickadees and goldfinches to feed and the upper limit will allow larger song birds such as cardinals and grosbeaks to feed while still not allowing pigeons or squirrels to feed in comfort from the perches.

TABLE 1

| Distance of Perch to sidewall | ANGLE OF OUTWARD SLOPE OF HOPPER SIDEWALL | | | | | Class of Subjects |
|---|---|---|---|---|---|---|
| | 75° | 70° | 67½° | 65° | 60° | |
| | Subjects able to gain access | | | | | |
| ¾'' | YES | NO | NO | NO | NO | SQUIRRELS |
| | NO | NO | NO | NO | NO | PIGEONS |
| | YES | YES | YES | YES | YES | SMALL BIRDS |
| | YES | NO | NO | NO | NO | MEDIUM BIRDS |
| | YES | NO | NO | NO | NO | LARGE BIRDS |
| 1'' | YES | YES | NO | NO | NO | SQUIRRELS |
| | NO | NO | NO | NO | NO | PIGEONS |
| | YES | YES | YES | YES | YES | SMALL BIRDS |
| | YES | YES | YES | NO | NO | MEDIUM BIRDS |
| | YES | YES | NO | NO | NO | LARGE BIRDS |
| 1¼'' | YES | YES | NO | NO | NO | SQUIRRELS |
| | YES | YES | NO | NO | NO | PIGEONS |
| | YES | YES | YES | YES | YES | SMALL BIRDS |
| | YES | YES | YES | NO | NO | MEDIUM BIRDS |
| | YES | YES | SOME | NO | NO | LARGE BIRDS |
| 1½'' | YES | YES | NO | NO | NO | SQUIRRELS |
| | YES | YES | NO | NO | NO | PIGEONS |
| | YES | YES | YES | YES | YES | SMALL BIRDS |
| | YES | YES | YES | YES | YES | MEDIUM BIRDS |
| | YES | YES | YES | YES | NO | LARGE BIRDS |
| 1¾'' | YES | YES | NO | NO | NO | SQUIRRELS |
| | YES | YES | SOME | NO | NO | PIGEONS |
| | YES | YES | YES | YES | YES | SMALL BIRDS |
| | YES | YES | YES | YES | YES | MEDIUM BIRDS |
| | YES | YES | YES | YES | YES | LARGE BIRDS |
| 2'' | YES | YES | YES | YES | NO | SQUIRRELS |
| | YES | YES | YES | YES | YES | PIGEONS |
| | YES | YES | YES | YES | YES | SMALL BIRDS |
| | YES | YES | YES | YES | YES | MEDIUM BIRDS |
| | YES | YES | YES | YES | YES | LARGE BIRDS |

As the upper limits of the separation S and angle $\phi$ are approached, it is possible for a squirrel to jump to the feeder, grab the feed tray 14, hang on from below and adjust its position to a metastable position above the trough 15 and eat for short periods of time. This phenomenon does not diminish the effectiveness of the invention since the squirrel will fall, its center of gravity being external to the feed trough. While the upper limits of the separation S will allow a squirrel access to the feeder, the squirrel can only marginally position itself on the perches for feeding and the energy expended to obtain a small amount of feed results in the squirrel quickly losing interest in attempting to eat from the bird feeder.

While the above discussion has specified the primary parameters for squirrel and pigeon proofing a bird feeder, it should be appreciated that other features will increase resistance. The roof construction can provide further resistance to squirrel and pigeon feeding.

For this reason, it is further preferred that the roof 18 have an overhang H which extends the roof 18 beyond the perch for the bird which, in the embodiment shown in FIGS. 1 through 4, is the peripheral edge 40 of the tray 14 (see FIG. 2). The roof should be a smooth surface so as to minimize the ability of a squirrel to cling to the roof as discussed earlier and should provide a minimum pitch in the vicinity of the periphery of the roof 18 of about $22\frac{1}{2}°$.

This overhang H will also deter undesirable birds by making it more difficult for the birds to approach the feeder and hover near the feed tray 14. The overhang H will also provide a safe feeding zone where selected birds can feed free from access by birds of prey. It is preferred that the overhang H for the roof 18, when measured by rays from the peripheral edge 40 to the roof perimeter, will provide a ray of minimum length (shown as ray 48 illustrated in FIGS. 2) making an angle e with the horizontal of not greater than about 48°.

It is further preferred that a perch be employed which is separate and distinct from the feed trough. In the embodiment shown in FIG. 5, a perch 50 is employed which is separately distinct from the feed trough 15. Having the perch 50 separated from the feed trough 15 provides multiple benefits. First, a separate perch 50 is preferred by birds since it provides a better gripping surface. Also, having a separate perch 50 reduces the volume V in the feed trough 15. This smaller volume of feed and the associated reduced feed surfaces 52 reduces the wind scouring which removes the feed from the feed trough 15. In addition to having the perch 50 separate, it is further preferred to truncate the troughs to form wells to reduce scattering of the feed by birds which is further discussed in the section describing FIG. 6.

Figure 5:
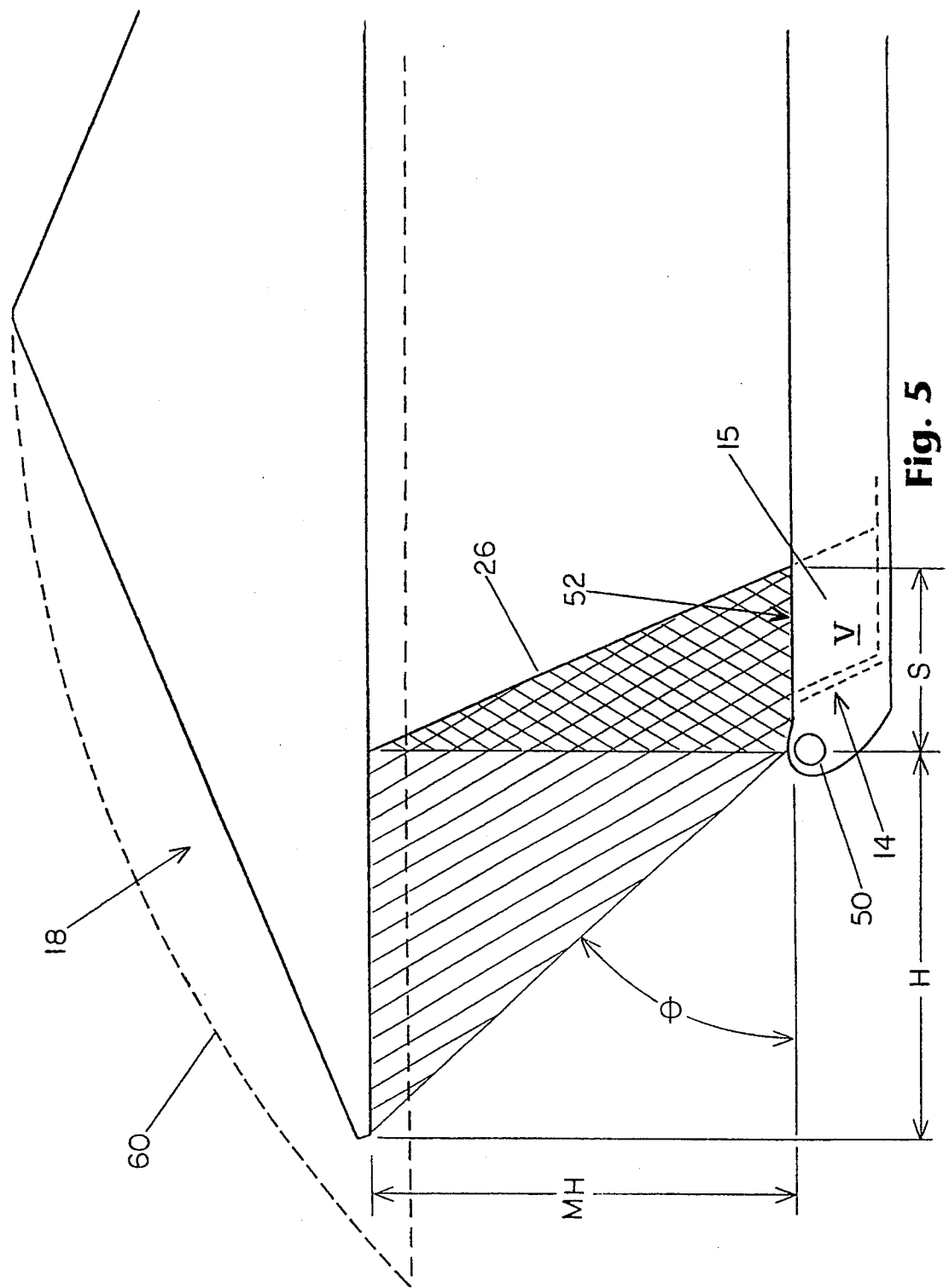
FIG. 5 is a schematic representation of a cross section of the feeder illustrating the various parameters which are critical to effect a more squirrel resistant bird feeder, to reduce the accessibility of the feeder to hovering birds such as pigeons and to limit access to the perches by birds of prey such as hawks.

FIG. 5 also illustrates a preferred maximum height MH for the distance of the roof above the perch 50. This height should be maintained at most at about 5". This maximum height MH reduces the ability of pigeons to gain access to the feed tray 14 since the low roof will not permit sufficient wing motion for pigeons to hover. It is further preferred that the MH to H ratio be maintained such that the included angle φ is a maximum of 48° to enhance the squirrel resistance. When the overhang H is so maintained, it also limits the ability of a squirrel on the roof 18 to swing onto the perch 50. The overhang H creates a security zone which cannot be readily penetrated by a squirrel (indicated by the right shaded lines). Having the perch 50 so separated from the sidewall 26 also creates a comfort zone (indicated by the left shaded lines) that is comfortable for song birds while being uncomfortable for squirrels and larger birds such as pigeons.

The dotted line 60 in FIG. 5 illustrates how a domed roof could be substituted for the roof 18. The interchangability of roof styles and other elements is discussed in greater detail with respect to FIG. 6. In all cases it is preferred that the roof create a convex cover for the hopper.

Figure 6:
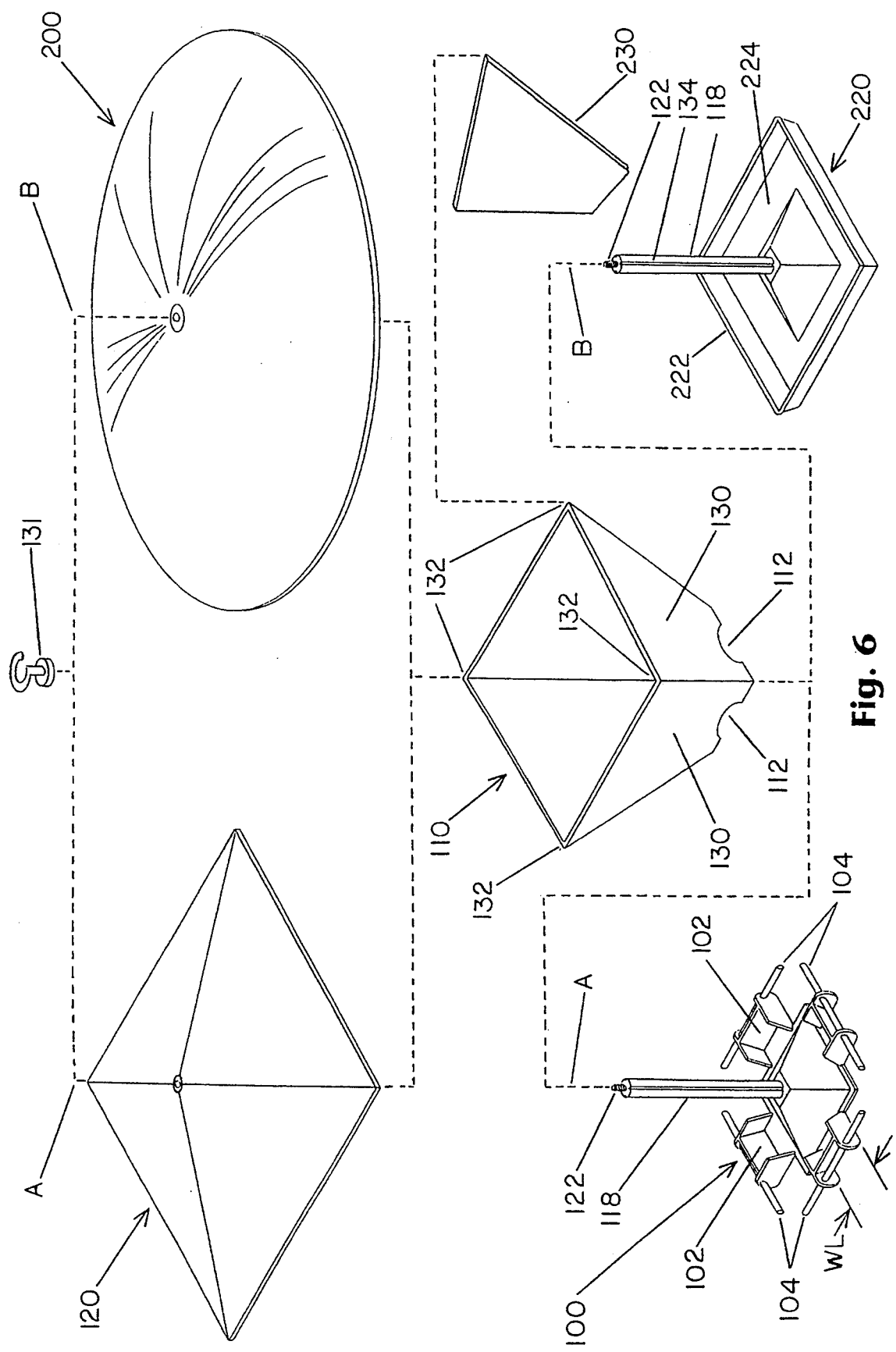
FIG. 6 is an assembly drawing illustrating two embodiments of the bird feeder of the present invention which include several common elements. The bird feeder assembled by path A on the left portion of FIG. 6 has the feeding compartments which are feed wells rather than troughs. The wells are particularly effective for fine feeds and limit wind scouring of the feed from the trays. The bird feeder resulting from assembly by path B, shown on the right path of FIG. 6, has a domed roof positioned above a hopper with a square cross section and dividers radiating outward from the center of the feeder to the corners of the hopper. These dividers provide separate feed bins in the hopper so different feeds can be stored and individually dispensed.

FIG. 6 is an assembly drawing illustrating two embodiments of the present invention and the variation of the appearance and function that can be obtained by modifying the shape of various elements of the bird feeder. Assembling the parts shown in path A will provide a feeder with crisp lines and one suitable for dispensing fine feeds such as thistle. Fine feeds are more susceptible to being blown from the feeder by the wind (wind scouring). A base 100 or modified feed tray provides deep feed wells 102 having reduced surface area as compared to the troughs 15 of the embodiment of FIGS. 1–4. The shape of the feed wells 102 reduces the wind scouring. Individual feed wells 102 with separate perch bars 104, minimize the open cross section of the well and provide reduced wind scouring for fine feeds such as thistle. Having discrete wells rather than extended troughs can also reduce the scattering by some birds. Scattering results from the head motion of some birds when feeding. These birds produce a side to side motion of their beaks. Maintaining a well length WL at not more than about $1\frac{3}{4}"$ has been found to minimize the scattering while still allowing sufficient area for the birds to feed. The base 100 engages a hopper 110 and ports 112 are provided to supply feed into the feed wells 102. A center post 118 is provided which attaches to the base 100 passing through the hopper 110. The use of a pyramid shaped roof 120 resting on the hopper 110 maintains the angular lines of the feeder. A threaded extension 122 is fastened to the center post 118. A hook 131 is employed as a hanging means and engages the threaded extension 122. The hook 131 in combination with the center post 118 holds the roof 120 in contact with the hopper 110 and secures the base 100 to the hopper 110. Having the roof 120 detachable provides for easy access to the hopper 110. Also, having both the base 100 and the roof 120 detachable facilitates cleaning of the feeder.

In the second embodiment of FIG. 6, the feeder is fabricated with the element illustrated in path B. A domed roof 200 is employed with the hopper 110 and an open tray 220. The open tray 220 has a peripheral edge 222 which serves as the perch for the birds. The ports 112 of the hopper 110 allow grain to pass from the hopper 110 into the feed trough 224 established between the sidewall 130 of the hopper 110 and the peripheral edge 222. Partitions 230 are shown that engage the corners 132 of the hopper 110 and slots 134 are provided in the center post 118 which attaches to the open tray 220. The roof 200 is held in place with the threaded extension 122. The partitions 230 allow various feeds to be kept in separate areas of the hopper 110 thereby giving the birds an opportunity to select between various feeds being provided by the feeder.

Figure 7:
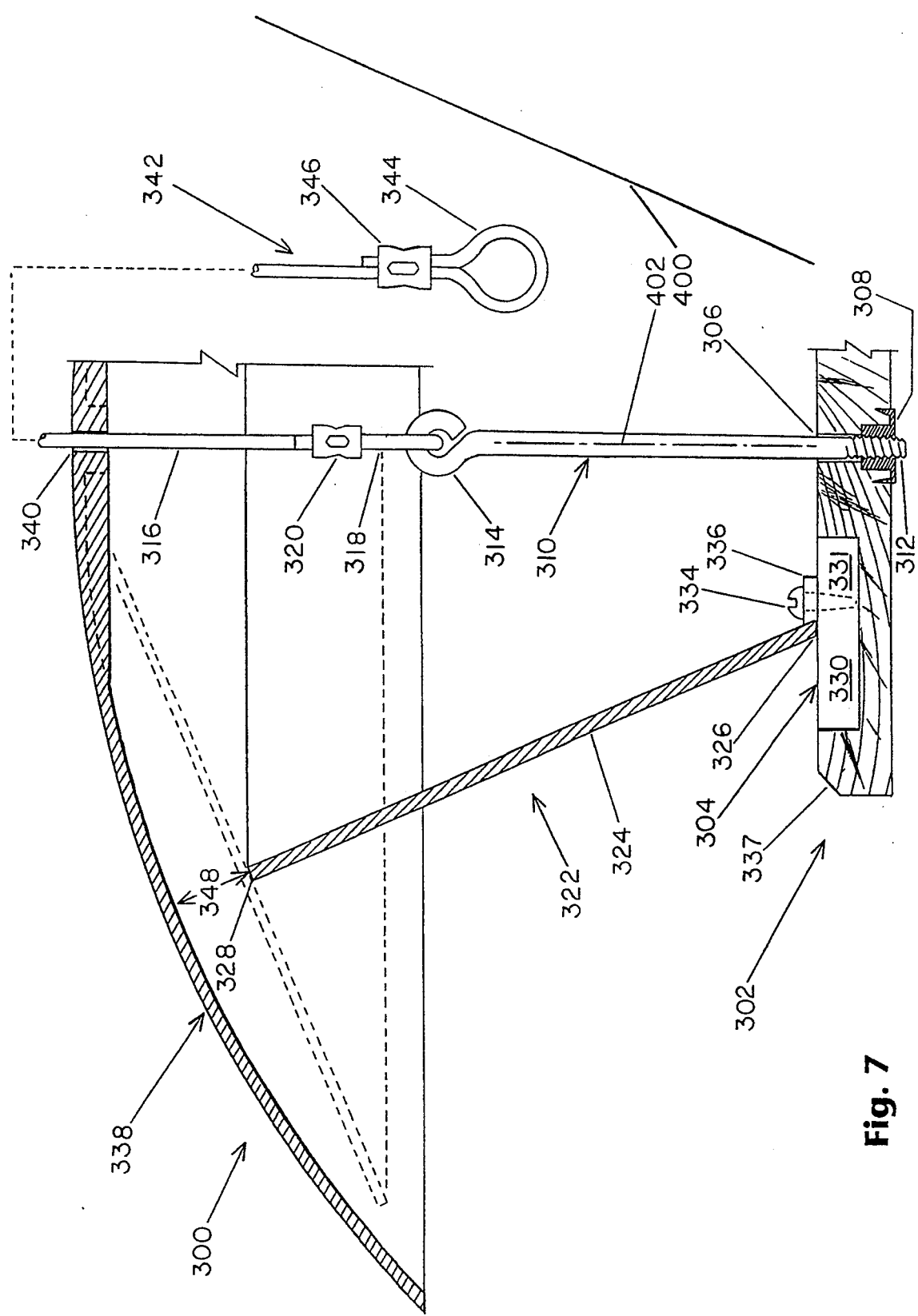
FIG. 7 is a partial cross section of an embodiment which employs the rectangular hopper and the domed roof. The base is fabricated from a solid platform of wood and has depressions therein which serve as feed wells and ports for distributing the feed to the feed wells.

FIG. 7 shows another embodiment of a bird feeder 300 of the present invention which is similar to the embodiment that is fabricated by the path B of FIG. 6. In the embodiment, the bird feeder 300 has a wooden feed tray 302 made from a rough plank. The wooden tray 302 has cylindrical depressions 304 therein noted in FIGS. 7 and 8. The wood tray 302 is preferably rough cut from lumber to provide the birds a better grip.

The wooden feed tray 302 has a central passage 306 therethrough. A blind nut 308 is embedded in the base. A rod 310 is provided which has a threaded end 312 which engages the blind nut 308. The rod 310 has an eye end 314. A flexible steel cable 316 passes through the eye end 314 of the rod 310. The flexible steel cable 316 has a first cable end 318 which passes the eye end 314 of the rod 310 and is secured with a first crimp fastener 320.

Figure 8:
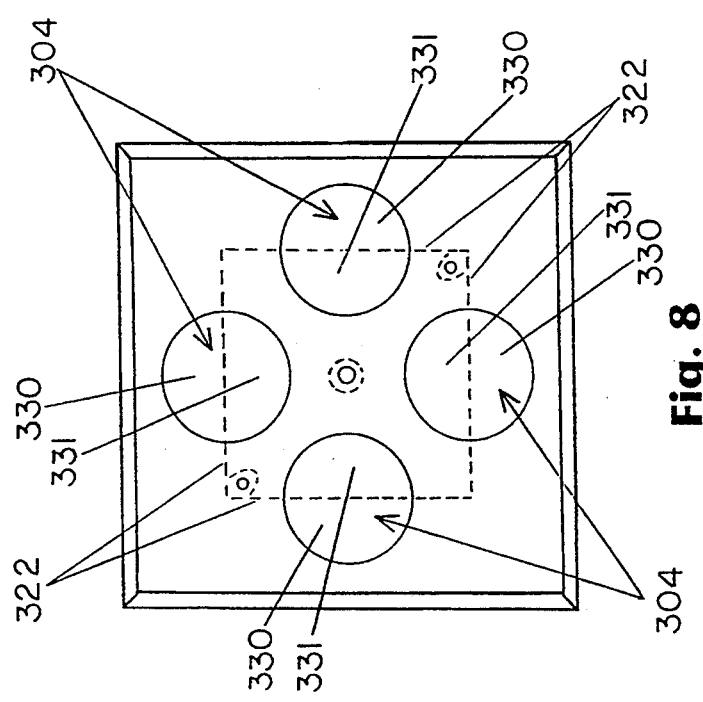
FIG. 8 is a top view of the base of the feeder of FIG. 7. Also shown, as a hidden line, is the trace of the hopper base on the feeder base.

A feed hopper 322 has a sidewall 324 with a base end 326 and a top end 328. The feed hopper 322 is positioned on the wooden feed tray 302 with respect to the depressions 304 such that the sidewall 324 partitions the depressions 304 with the sidewall base end 326 as illustrated in FIG. 8. The depressions 304 are partitioned into a feed well segments 330 and hopper segments 331. The feed well segments 330 lie outside the base end 326 of the hopper 322 and provide feed wells from which the birds can feed. The hopper segment 331 of the depressions 304 which lie beneath the hopper 322 supply feed from the hopper 322 to the feed well segments 330 and serve as feed ports to maintain feed in the feed well segments 330 from which the birds eat.

The hopper 322 is secured to the wooden tray 302 with screws 334 which pass through tabs 336 attached to the base end 326 of the hopper 322. The edge 337 of the feed tray 302 serves as a perch for the birds.

A domed roof 338 which is a spherical section of a sphere similar to the roof of the embodiment of path B of FIG. 6. The roof 338 has a passage 340 through which the flexible steel cable 316 passes. The passage 340 is sized so as to provide a slip fit with the flexible steel cable 316. A second end 342 of the flexible steel cable 316 is provided with a loop 344 for hanging the bird feeder 300. The loop 344 is secured by a second crimp fastener 346. When the bird feeder 300 is hung by the loop 344, the roof 338 will rest on the top end 328 of the sidewall 324 of the hopper 322. When a rectangular hopper such as the rectangular hopper 322 of FIG. 6 mates with a domed roof which is a spherical section, open spaces 348 result between the roof 338 and the top end 328 of the hopper sidewall 324. The open spaces 348 are a result of the domed roof 338 being supported by four corners of the top end 328 of the sidewall 324 of the hopper 322. The open spaces 348 provide ventilation and allow trapped moisture to escape.

Figure 9:
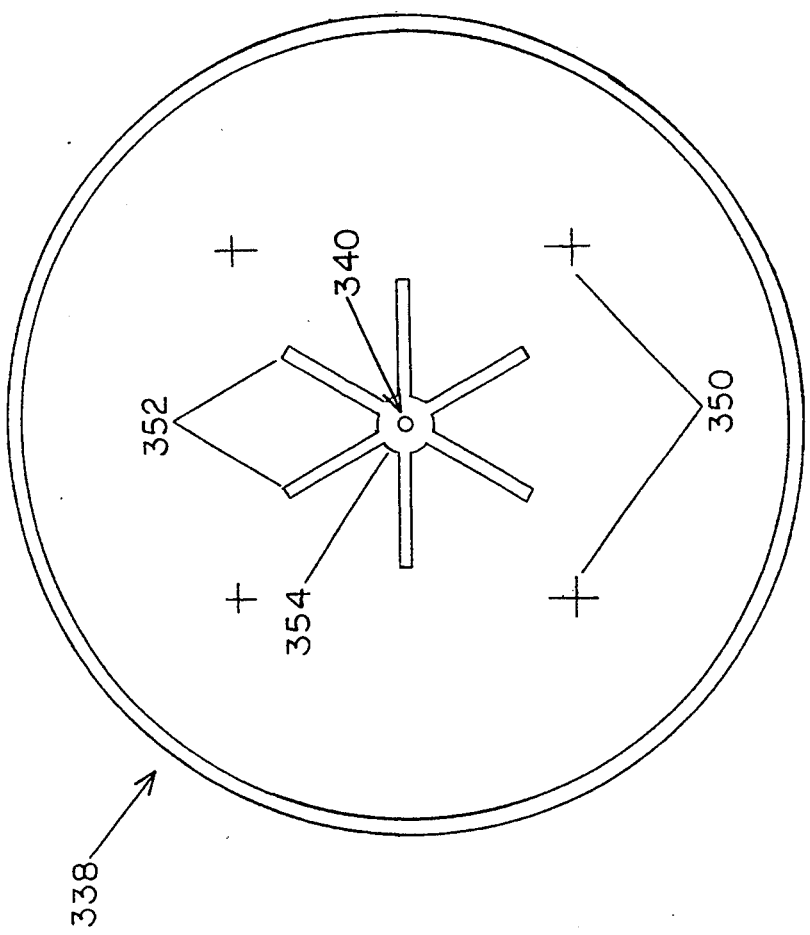
FIG. 9 is a bottom view of the domed roof of the feeder of FIGS. 7 and 8 with gussets for increasing the rigidity of the roof.

FIG. 9 is a top view of the roof 338 and shows contact points 350 where the roof 338 comes into contact with the rod end 328 of the sidewall 324 of the hopper 322. The point contact is responsible for the open spaces 348. To increase the rigidity of the roof 338, gussets 352 are provided. The gussets 352 meet at a central hub 354. The central hub 354 extends the passage 340 and aids in maintaining the slip fit between the passage 340 and the flexible steel cable 316.

While the hoppers illustrated in the preceding embodiments are illustrated with square cross sections, as discussed earlier, hoppers with other geometries can be readily substituted. In fact, if a hopper with a conical cross section were to be employed in the embodiment of FIGS. 7 through 9, the open spaces 348 will not be formed. Alternatively, if a pyramid roof shown in dotted lines is employed with the frusto-pyramid hopper 322 of FIG. 7, there will not be the open spaces 348.

The bird feeders discussed above have been feeders where the hoppers have sidewalls with straight lines. For example, referring to FIG. 7, the hopper 322 can be generated from a straight line 400 which is translated in a square pattern about a central axis 402.

Figure 10:
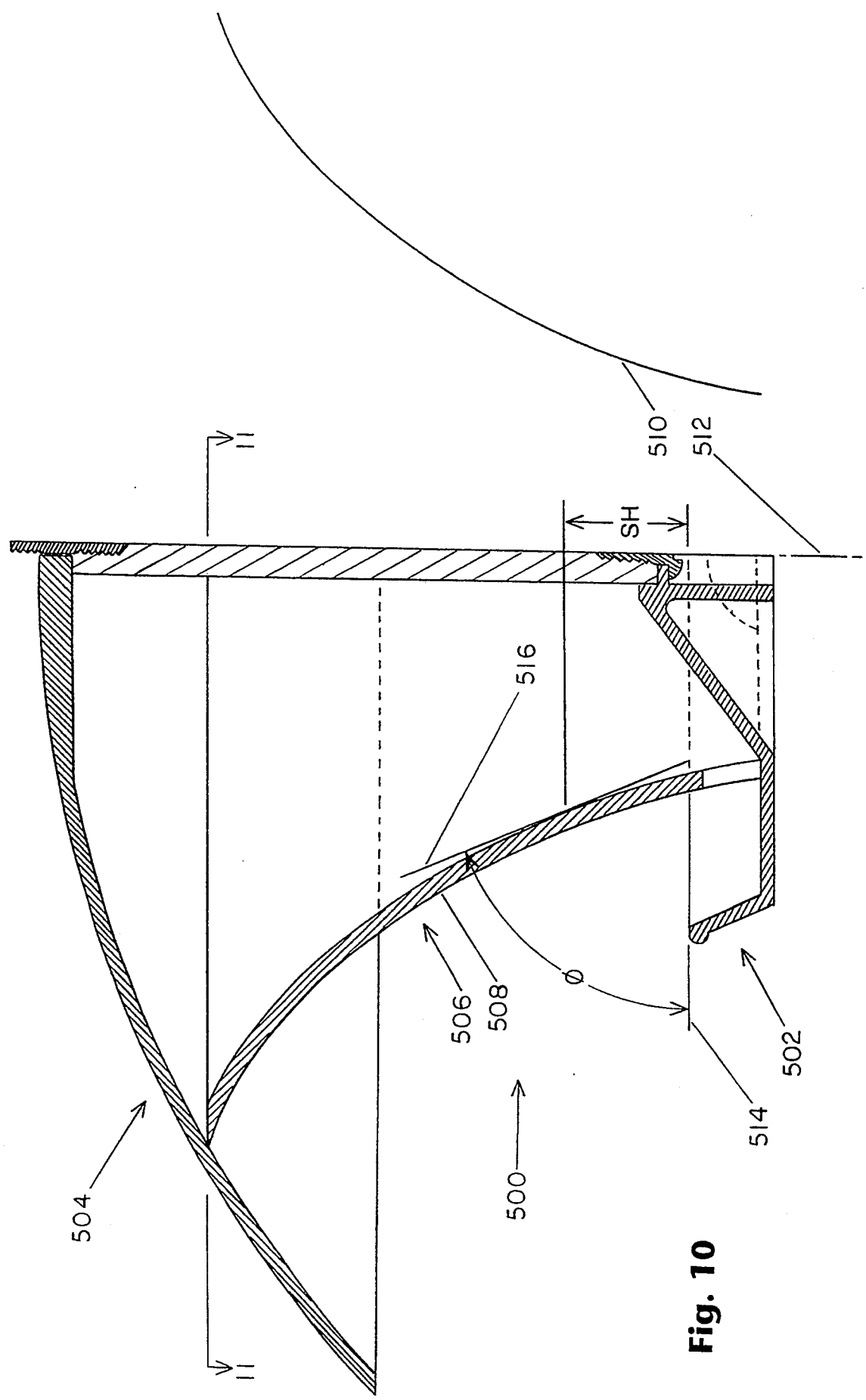
FIG. 10 is a section of another embodiment of the present invention where the feed hopper has a trumpet shaped profile.
Figure 11:
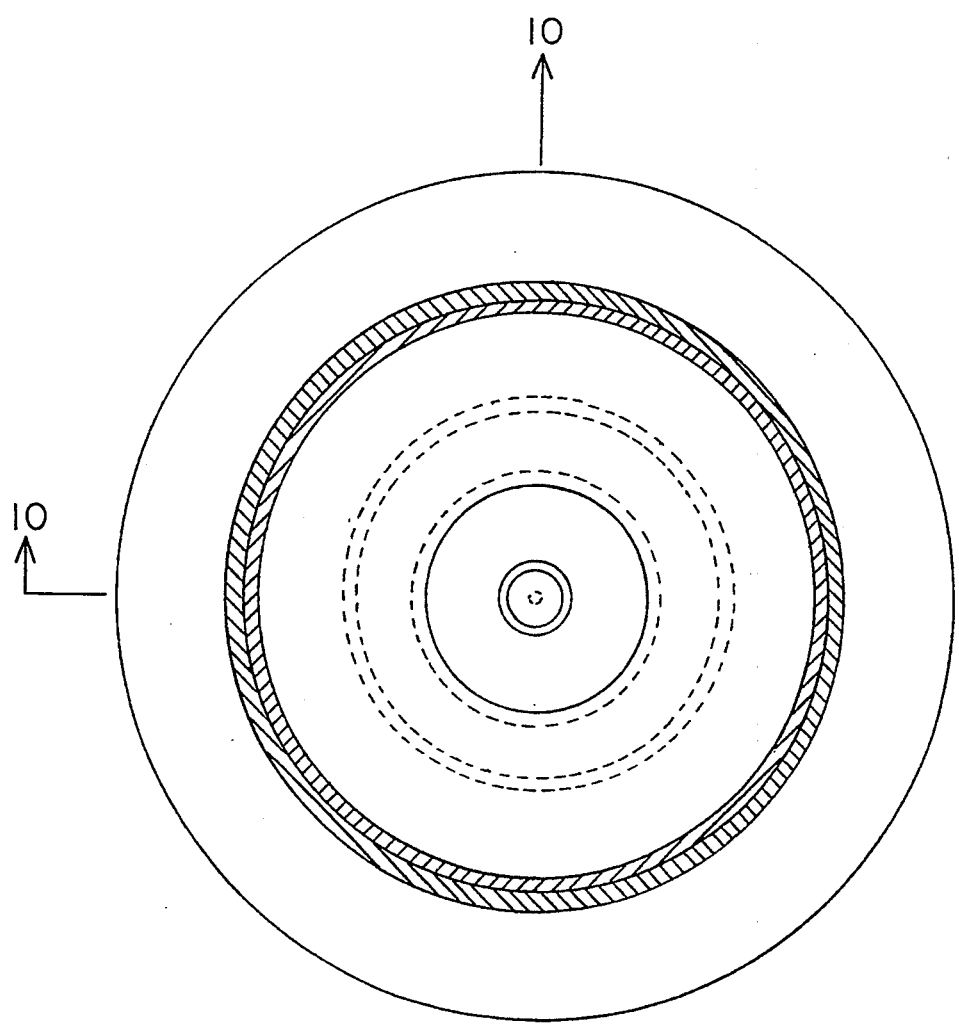
FIG. 11 is a view of section 11—11 of FIG. 10.

One can generate the wall from a curved line rotated about a central axis. FIGS. 10 and 11 illustrate a bird feeder of the present invention where the hopper sidewall is generated with a curved line rotated about a central axis.

A bird feeder 500, which has a vertical section illustrated in FIG. 10, has a circular feed tray 502 and a domed roof 504. The trumpet shape feed bin 506 having a curved hopper wall 508 is interposed therebetween. The trumpet shape feed bin 506 can be generated by rotating an exponential curve 510 about a rotation axis 512.

When a curved hopper wall 508 such as illustrated in FIG. 10 is employed, the angle $\phi$ made between the feed tray 502 and the hopper wall 508 will vary along the length of the wall. However, in this case the same geometric principal applies for squirrel proofing the feeder.

In the case of a curved wall, the angle $\phi$ will be determined at shoulder height SH by using the tangent to the curve 516. The shoulder height SH is the average shoulder height of a squirrel and is about $1\frac{1}{2}''$. Such a design may be advantageous in certain situations for appearance and can increase the storage capacity of the feeder.

While the novel features of the present invention have been described in terms of particular embodiments and preferred applications, it should be appreciated by one skilled in the art that substitution of materials and details obviously can be made without departing from the spirit of the invention.

What I claim is;

1. An improved bird feeder having,
   a feed hopper bounded by a hopper sidewall, the sidewall having a base end and a top end;
   a feed tray attaching to the base end of the feed hopper and extending beyond and so configured to provide feeding compartments, the feed tray having perches attached thereto;
   feed ports connecting the feed hopper and the feed tray;
   a roof having a roof peripheral edge, the roof attaching to the top end of the hopper wall; and
   means for attaching the feed tray, the feed hopper and the roof;
the improvement comprising:
   maintaining the hopper sidewall so inclined to form an included angle $\phi$ between the sidewall and the feed tray greater than about 60° and less than 70° and the perches being spread apart by a perch separation S from the sidewall by not less than about $\frac{3}{4}$ of an inch nor more than about $1\frac{1}{2}$ of an inch.

2. The improved bird feeder of claim 1 wherein said angle $\phi$ is between about 65° and 70°.

3. The improved bird feeder of claim 2 herein said perch separation S is between about $1\frac{1}{4}''$ and $1\frac{3}{4}''$.

4. The improved bird feeder of claim 3 wherein $\phi$ is about $67\frac{1}{2}''$.

5. The improved bird feeder of claim 3 wherein the means for attaching the feed tray, the hopper, and the roof further comprises:
   a center post attaching to the feed tray;
   a hanger positioned on the roof; and
   means for attaching said center post to said hanger.

6. The improved bird feeder of claim 4 wherein the means for attaching the feed tray, the hopper, and the roof further comprises:
 a center post attaching to the feed tray;
 a hanger positioned on the roof; and
 means for attaching said center post to said hanger.

7. The improved bird feeder of claim 5 wherein the ports are in the sidewall of the hopper and wherein the feed tray further comprises:
 a planar surface with a raised section contoured to engage the base end of the hopper; and
 a peripheral sidewall having a tray peripheral edge attaching to said planar surface, said peripheral sidewall and the hopper sidewall forming a trough providing the feed compartments and tray said peripheral edge forming the perches.

8. The improved bird feeder of claim 6 wherein the ports are in the sidewall of the hopper and wherein the feed tray further comprises:
 a planar surface with a raised section contoured to engage the base end of the hopper; and
 a peripheral sidewall having a tray peripheral edge attaching to said planar surface, said peripheral sidewall and the hopper sidewall forming a trough providing the feed compartments and said tray peripheral edge forming the perches.

9. The improved bird feeder of claim 7 wherein the perches are spaced apart from the feeding compartments and further wherein the feeding compartments are truncated to provide a well length WL.

10. The improved bird feeder of claim 8 wherein the perches are spaced apart from the feeding compartments and further wherein the feeding compartments are truncated to provide a well length WL.

11. The improved bird feeder of claim 3 wherein the means for attaching the feed tray, the feed hopper, and the roof, further comprises:
 a rod attaching to the feed tray; and
 a cable attaching to said rod and passing through the roof.

12. The improved bird feeder of claim 4 wherein the means for attaching the feed tray, the feed hopper, and the roof, further comprises:
 a rod attaching to the feed tray; and
 a cable attaching to said rod and passing through the roof.

13. The improved bird feeder of claim 11 wherein the feed tray further comprises:
 a planar surface with a raised section contoured to engage the base end of the hopper; and
 a peripheral sidewall having a tray peripheral edge attaching to said planar surface, said peripheral sidewall and the hopper sidewall forming a through providing the feed compartments, said tray peripheral edge forming the perches.

14. The improved bird feeder of claim 12 wherein the feed tray further comprises:
 a planar surface with a raised section contoured to engage the base end of the hopper; and
 a peripheral sidewall having a tray peripheral edge attaching to said planar surface, said peripheral sidewall and the hopper sidewall forming a through providing the feed compartments said tray peripheral edge forming the perches.

15. The improved bird feeder of claim 13 wherein the perches are spaced apart from the feeding compartments and further wherein the feeding compartments are truncated to provide a well length WL.

16. The improved bird feeder of claim 14 wherein the perches are spaced apart from the feeding compartments and further wherein the feeding compartments are truncated to provide a well length WL.

17. The improved bird feeder of claim 11 wherein the feed tray is a solid tray having depressions therein, said depressions being positioned beneath the sidewall forming a feed well segment external to the hopper serving as the feeding compartments and hopper segments which serve as the ports to the feeding compartments.

18. The improved bird feeder of claim 12 wherein the feed tray is a solid tray having depressions therein, said depressions being positioned beneath the sidewall forming a feed well segment external to the hopper serving as the feeding compartments and hopper segments which serve as the ports to the feeding compartments.

19. The improved bird feeder of claim 17 wherein said solid tray is wood.

20. The improved bird feeder of claim 18 wherein said solid tray is wood.

21. The improved bird feeder of claim 1 wherein the roof creates a convex cover for the hopper.

22. The improved bird feeder of claim 2 wherein the roof creates a convex cover for the hopper.

23. The improved bird feeder of claim 3 wherein the roof creates a convex cover for the hopper.

24. The improved bird feeder of claim 9 wherein said well length WL is not more than about $1\frac{3}{4}''$.

25. The improved bird feeder of claim 10 wherein said well length WL is not more than about $1\frac{3}{4}''$.

* * * * *